United States Patent [19]

Chang

[11] Patent Number: 4,949,616
[45] Date of Patent: Aug. 21, 1990

[54] STEPLESS TRANSMISSION SCROLL SAWING MACHINE WITH SAW BLADE FASTENING AND MICRO-INCH ADJUSTING MEANS AND THE RELATED POSITIONING DEVICE

[76] Inventor: Andy Chang, No. 38, Juan Liau Road, Fong Yuan, Taichung, Taiwan

[21] Appl. No.: 355,430

[22] Filed: May 22, 1989

[51] Int. Cl.⁵ .............................................. B27B 19/06
[52] U.S. Cl. ........................................ 83/748; 83/781; 83/782; 83/783
[58] Field of Search ................. 83/783, 427, 431, 401, 83/699, 700, 698, 781, 782, 464, 465, 748

[56] References Cited

U.S. PATENT DOCUMENTS

| | | | |
|---|---|---|---|
| 4,625,609 | 12/1986 | Ashworth | 83/748 |
| 4,646,605 | 3/1987 | Rice et al. | 83/783 |
| 4,681,006 | 7/1987 | Miller | 83/699 |
| 4,771,667 | 9/1988 | Forman et al. | 83/100 |
| 4,838,138 | 6/1989 | Rice et al. | 83/698 |

Primary Examiner—Hien H. Phan
Assistant Examiner—Hwei-siu Payer
Attorney, Agent, or Firm—Bucknam and Archer

[57] ABSTRACT

The present invention is related to a stepless transmission scroll sawing machine with saw blade fastening and micro-inch adjusting device and the related positioning device and, more particularly to a scroll sawing machine which includes a carbon brush motor controlled by means of a control circuit to drive an eccentric plate to carry the saw blade control arms to make an up-and-down reciprocating motion so as to perform sawing process, wherein a saw blade fastening and micro-inch adjusting device is set to fasten up the saw blade and to adjust the tension of the saw blade according to the material to be processed, and wherein a positioning device is mounted on the upper arm to press on the material to be processed to facilitate the performing of sawing process and to prevent the saw blade from breaking.

3 Claims, 4 Drawing Sheets

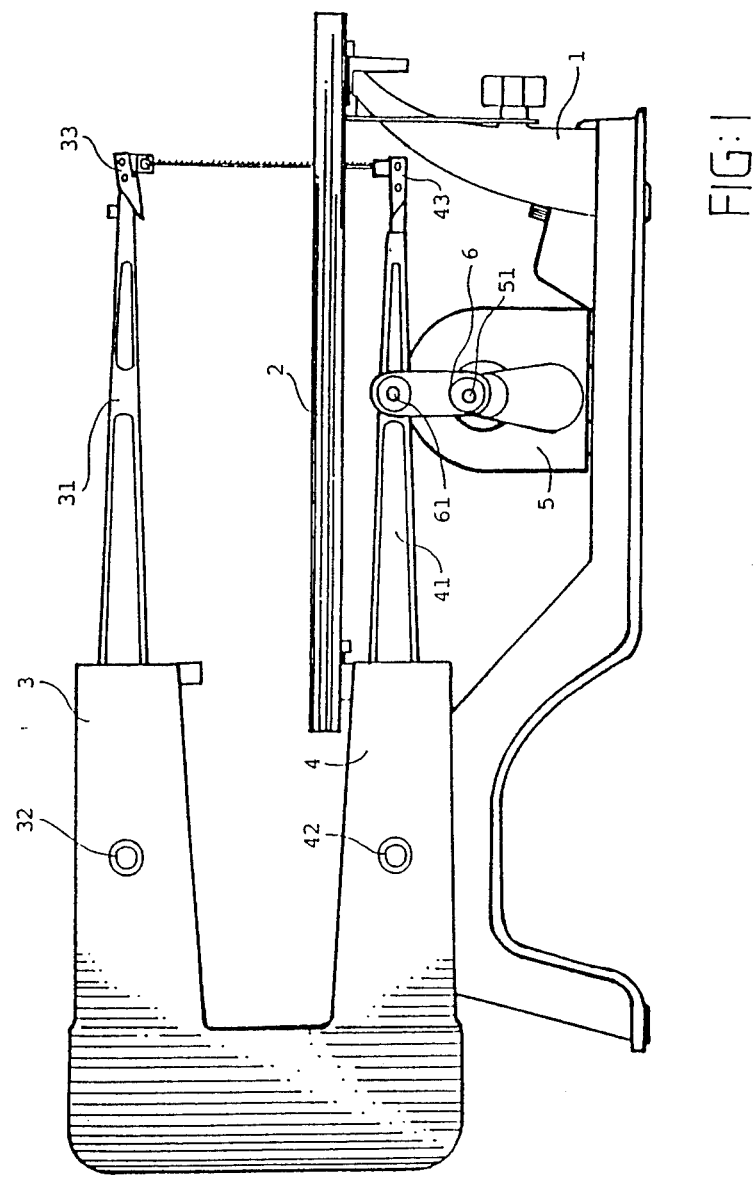
FIG:1

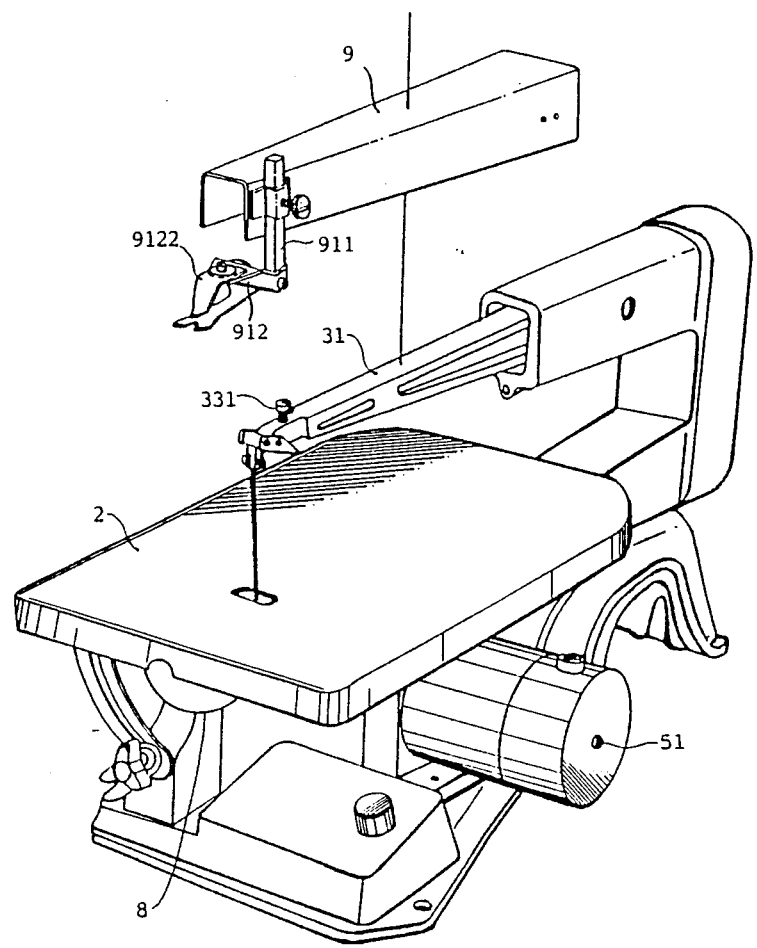
FIG:2
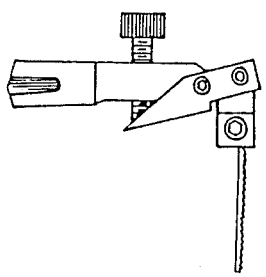
FIG:3

STEPLESS TRANSMISSION SCROLL SAWING MACHINE WITH SAW BLADE FASTENING AND MICRO-INCH ADJUSTING MEANS AND THE RELATED POSITIONING DEVICE

BACKGROUND OF THE INVENTION

Following electronic technology development, machine tools and processing machinery have been improved in performance and security. In consequence, a diversified processing machinery has been used in every industry.

On the other hand, due to the development of material science, the process has become more complicated because a single item may be comprised of various different materials. Therefore, high performance processing machinery which requires minimized power consumption and provides maximized capacity is commonly required.

In other words, the best way to improve production flow is to use the processing machinery which provides high compatibility and versatility; that is the selection of the right machine, according to the material to be processed, to perform specific processing has great importance with respect to the strength of competition of a company.

For example, when to process a photo frame (acrylic or wooden material) by means of a regular scroll sawing machine, if the material is changed, the saw blade or even the whole set of the machine has to be changed accordingly because the revolving speed of the motor used in conventional scroll sawing machine is constantly fixed. It is very time-consuming to change the saw blade according to the material to be processed, or it will not be economical to prepare a complete series of scroll sawing machines of different sawing speed for occasional use.

SUMMARY OF THE INVENTION

The present invention is related to a stepless transmission scroll sawing machine with saw blade fastening and micro-inch adjusting means and the related positioning device which includes a carbon brush motor controlled by means of a control circuit to drive an eccentric plate to carry the saw blade control arms to make an up-and-down reciprocating motion so as to perform sawing process. The saw blade fastening and micro-inch adjusting means is set to fasten up the saw blade and to adjust the tension of the saw blade according to the material to be processed, and wherein a positioning device is mounted on the upper arm to press on the material to be processed to facilitate the performing of sawing process and to prevent the saw blade from breaking.

The objects, features and advantages of the present invention will be fully understood from the following detailed description of the preferred embodiment considered in connection with the annexed drawings as hereunder.

BRIEF DESCRIPTION OF THE DRAWINGS

FIG. 1 is a front view of the present invention.

FIG. 2 is a perspective schematic drawing of the present invention.

FIGS. 3, 4a and 4b are perspective schematic drawings of the saw blade fastening and micro-adjusting device.

DETAILED DESCRIPTION OF THE PREFERRED EMBODIMENT

Figure 4A:
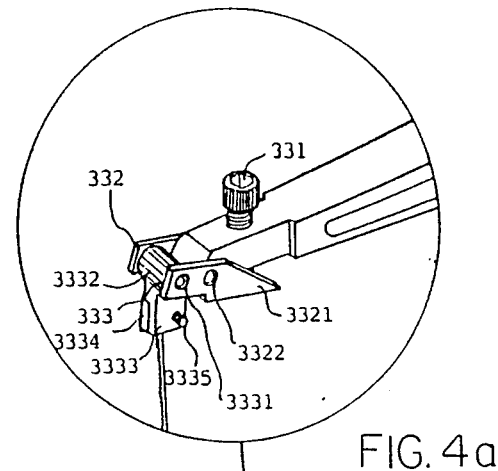

Referring to the annexed drawings, a scroll sawing machine includes a base (1) having respectively mounted on it a flat working table (2), an upper revolving carriage (3) and a lower revolving carriage (4), wherein the upper revolving carriage (3) and the lower revolving carriage (4) are connected together at one end to define a certain degree of contained angle, with the other ends movably connected with an upper arm (31), which has an upper saw blade holder (33), and a lower arm (41), which has a lower saw blade holder (43), by means of an upper locking bolt (32) and a lower locking bolt (42), such that a saw blade may be connected between the upper saw blade holder (33) and the lower saw blade holder (43) to flexibly perform sawing process.

A variable-speed motor (5) which is connected to a power supply through a control circuit is mounted on the base (1) and set at one side, with its revolving shaft (51) connected with a first eccentric plate (6), which first eccentric plate (6) has the other end connected to a bearing point (61) in the middle part of the lower arm (41). A second eccentric plate of same mass is set opposite to the first eccentric plate (6) to neutralize shocking force resulting from sawing process.

An adjusting plate (8) which has a protractor scale and a curved recess is respectively connected with the base (1) and the working table (2) at both ends to adjust the angular position of the working table (2) by means of an adjusting knob. According to the present invention, the range of adjustment of the angular position of the working table (2) may be adjusted 45° leftward or 30° rightward. An arm shield (9) covers the upper saw blade holder (33) for connection with a positioning device to help positioning of the saw blade and the material to be processed.

The variable-speed motor (5) is turned on to carry the first eccentric plate (6) to further drive the upper and lower arms to make up-and-down reciprocating motion so as to perform sawing process. When sawing speed has to be changed to fit for processing different material, the revolving speed of the variable-speed motor (5) can be easily adjusted by means of control circuit.

According to the present invention, the most preferable variable-speed motor is a carbon brush motor of which the revolving speed is set between 520 RPM to 2200 RPM.

Figure 4B:
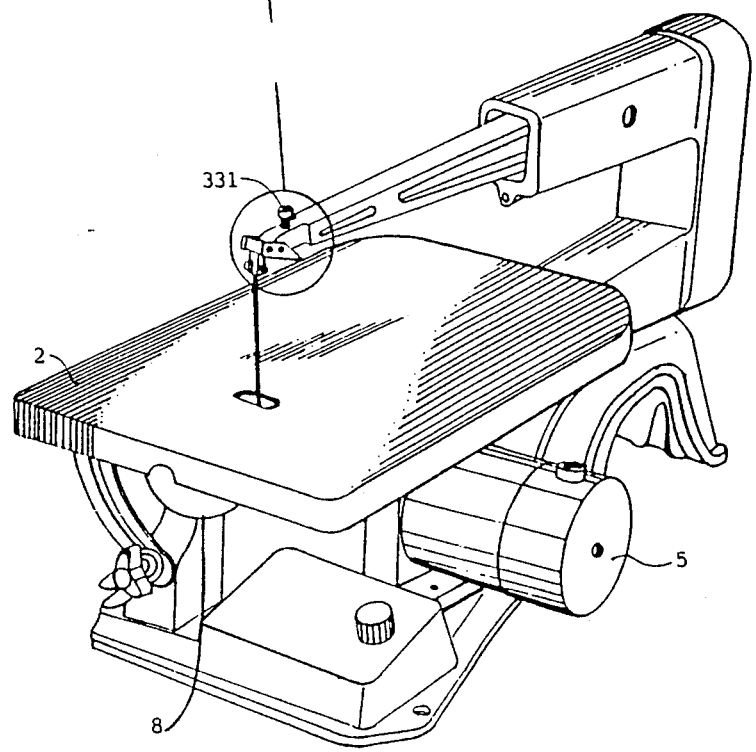

As shown in FIGS. 3, 4a and 4b, a revolving knob (331) is mounted on the upper arm (31) at the front end to pivotally screw in and out by means of its outer thread so as to control the position of an adjusting block (332). The basket-like adjusting block (332) has two side wings (3321) movably connected with the front end of the upper arm (31) at both sides by means of a locking bolt (3322). The two side wings (3321) of the adjusting block (332) have the front ends respectively connected to the cylinder (3332) of a fixed block (333) at both lateral sides by means of a locking bolt (3331) so that the fixed block (333) is permitted to move against the adjusting block (332) within a certain range. In addition to the cylinder (3332), the fixed block (333) includes a first clamping element (3333) connected with a second clamping element (3334) to clamp a saw blade, letting the saw blade to be firmly retained therebetween by means of screw means (3335).

After a saw blade is retained by the two clamping elements (3333) and (3334) and screwed therebetween by means of the screw means (3335), the tension of the saw blade can be adjusted by means of the revolving knob (331). When the revolving knob (331) is screwed inwardly, the bottom screw rod of the revolving knob (331) will press on the base of the adjusting block (332) to carry the fixed block (333) to move upward so as to pull up the saw blade to strengthen its tension. On the contrary, when the revolving knob (331) is screwed outwardly, the tension of the saw blade will become loosened.

Please refer to FIGS. 5 and 6 again. The arm shield (9) is a tapered channel bar, having a retaining plate (92) mounted thereon at one lateral side to define a gap (921) therebetween for setting therein the adjusting rod (911) of a positioning device (91). The positioning device (91) comprises an adjusting rod (911) having one end inserted into the gap (921) of the retaining plate (92) and having the other end connected with an adjusting clamp means (912) by means of a screw means, wherein the height of the positioning device (91) is adjusted according to the extent the adjusting rod (911) is inserted into the gap (921) of the retaining plate (92). The adjusting clamp means (912) is comprised of a lower pressure plate (9121) and a bent upper pressure plate (9122), so that the lower pressure plate (9121) firmly retains the material to be processed, and the upper pressure plate (9122) has a front notch (9123) to confine the swinging range of the saw blade, and also has a rear notch (9124) through which a screw means (9125) is screwed to movably connect the upper pressure plate (9122) to the adjusting clamp means (912).

Figure 5:
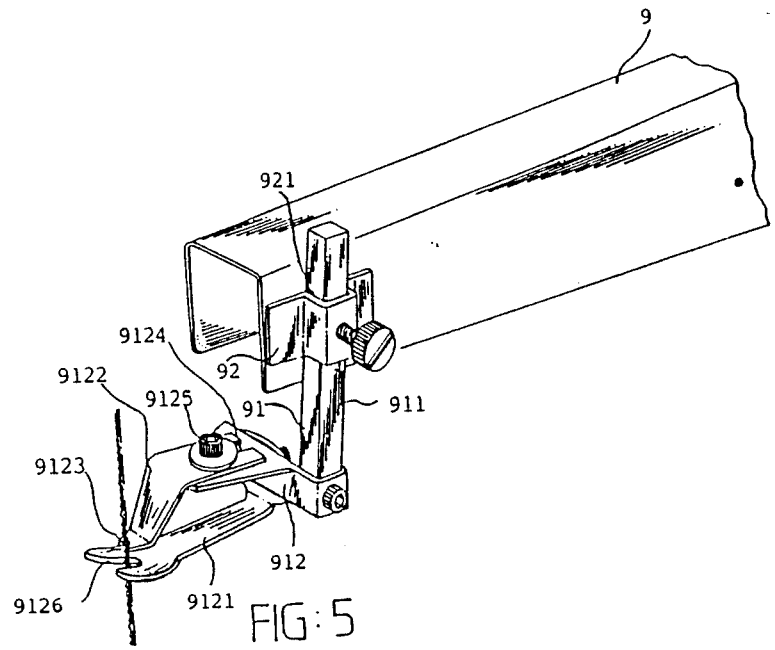
FIGS. 5 and 6 are perspective schematic drawings of the positioning device.
Figure 6:
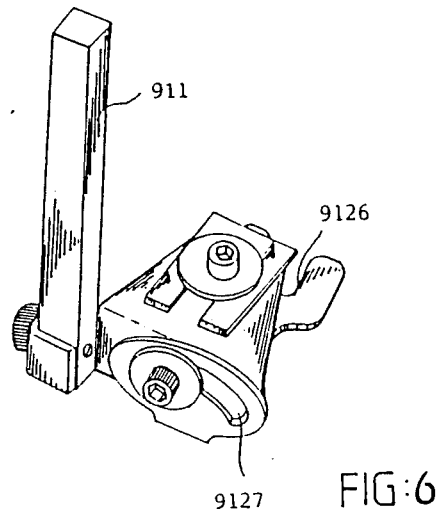

As shown in FIGS. 5 and 6, the lower pressure plate (9121) has forked front end slightly turning upwardly to define a front notch (9126) for passing therethrough the saw blade, and has a circular rear end turning upwardly to connect with the rear side of the positioning device (91) by means of a screw means through a curved back notch (9127) made on the rear end of the lower pressure plate (9121). Therefore, the angular position of the lower pressure plate (9121) may be adjusted by means of the screw means which is screwed on the rear notch (9127).

When in operation, the positioning device (91) is fixed to the arm shield (9) to let the lower pressure plate (9121) be adjusted by means of the adjusting rod (911) to press on the material which is placed on the working table so as to facilitate performing the sawing process. If the material to be processed is not a flat article, the lower pressure plate (9121) may be properly adjusted through the curved notch (9127) to obtain a right angular position so as to firmly retain the material to be processed.

In conclusion, the present invention provides a scroll sawing machine which includes a positioning device to firmly retain the material to be processed for performing high precision sawing process, and to confine the swinging range of the saw blade within the front notch (9123) of the upper pressure plate (9122) to prevent from breaking of the saw blade.

As indicated, the structure herein may be variously embodied. Recognizing various modifications will be apparent, the scope hereof shall be deemed to be defined by the claims as set forth below.

I claim:

1. A stepless transmission scroll sawing machine for sawing a material with a saw blade and saw blade fastening and micro-inch adjusting means and a positioning device which comprises a base with a flat working table mounted thereon, said flat working table being adjustable to turn leftwardly or rightwardly, an upper revolving carriage and a lower revolving carriage being connected together at one end thereof to define a determined degree of contained angle, the other ends thereof being movably connected with an upper arm and a lower arm, each of said upper and lower arms having saw blade fastening and micro-inch adjusting means, a variable-speed motor mounted on said base and set at one side thereof, one end of said motor being connected to a power supply through a control circuit, said motor having a revolving shaft connected with a first eccentric plate and a second eccentric plate, said first eccentric plate being connected to a bearing point located in the middle of said lower arm, said second eccentric plate being of the same mass as said first eccentric plate and being set opposite to said first eccentric plate to neutralize the shocking force resulting from the sawing process, said upper and lower arms having an upper and a lower saw blade holder, an arm shield covering said upper saw blade holder, positioning means for the saw blade and for said material connected to said arm shield, wherein said positioning means comprise a retaining plate mounted at one side of said arm shield, said arm shield is a reduced channel bar, said retaining plate and said arm shield define an orifice, said positioning means comprising an adjusting rod having one end inserted into said orifice whereby the height of said positioning means is adjustable according to the extent said adjusting rod is inserted into said orifice, the other end of said adjusting rod connected to an adjusting clamp means by means of screw means, said adjusting clamp means comprising a lower pressure plate and a bent upper pressure plate, said lower pressure plate retaining the material to be processed during sawing, said upper pressure plate having a front notch, whereby the swinging range of said saw blade held between said upper and lower arms is confined, said upper pressure plate also having a back notch for engagement with screw means to movably connect said upper pressure plate to said adjusting clamp means, said lower pressure plate having a forked front end turning upwardly to define a front notch for passing therethrough said saw blade and having a rear notch at the rear end thereof for adjusting the angular position of said lower pressure plate by means of screw means.

2. The stepless transmission scroll sawing machine according to claim 1, wherein said variable-speed motor is a carbon brush motor of revolving speed set between 520 RPM to 2200 RPM.

3. The stepless transmission scroll sawing machine according to claim 1 wherein said saw blade fastening and micro-inch adjusting means comprises a revolving knob having a screw rod penetrating through the arm of the associated revolving carriage; a basket-like adjusting block having two side wings movably connected with the front end of the associated arm at both sides by means of a locking bolt, a fixed block having a cylinder and connected to said adjusting block, said two side wings of said adjusting block having the front ends respectively connected to said cylinder of said fixed block at both lateral sides by means of a locking bolt whereby the position of said fixed block is adjusted in response to the motion of said revolving knob, said fixed block also having a first clamping element connected with a second clamping element to clamp said saw blade.

* * * * *